J. G. LETTELIER.
Clamp for Attaching Scroll-Saws to Sewing-Machines.
No. 209,764. Patented Nov. 12, 1878.
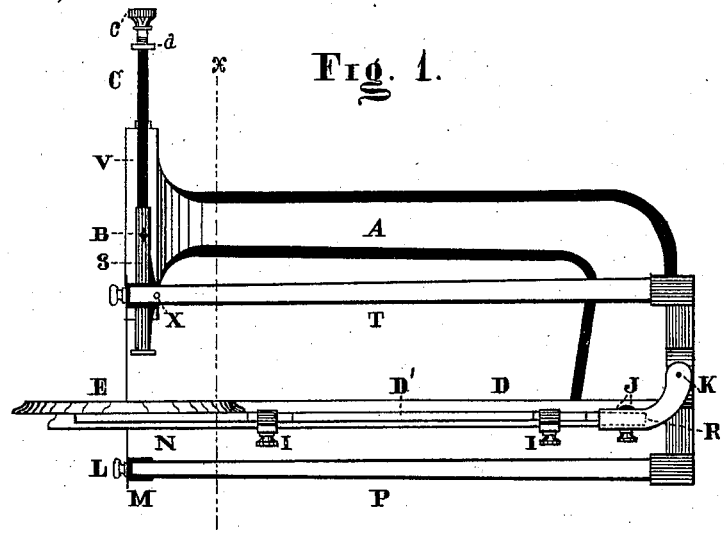
Fig. 1.
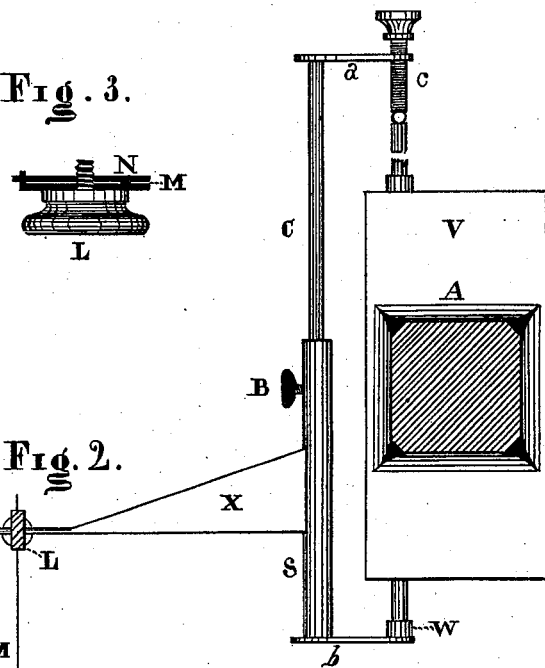
Fig. 3.
Fig. 2.
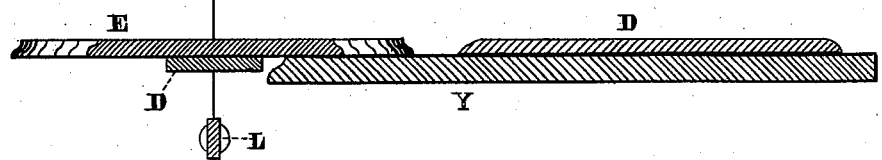
WITNESSES
A. G. Morey.
F. J. Smith
INVENTOR
John G. Lettelier
By G. L. Chapin
Atty.

UNITED STATES PATENT OFFICE.

JOHN G. LETTELIER, OF CHICAGO, ILLINOIS.

IMPROVEMENT IN CLAMPS FOR ATTACHING SCROLL-SAWS TO SEWING-MACHINES.

Specification forming part of Letters Patent No. 209,764, dated November 12, 1878; application filed March 2, 1878.

*To all whom it may concern:*

Be it known that I, JOHN G. LETTELIER, of Chicago, county of Cook, and State of Illinois, have invented a new and useful Improvement in Clamps for Attaching Scroll-Saws to Sewing-Machines, of which the following is a specification:

The nature of the present invention consists, principally, in an adjustable clamp fastened to the upper and lower ends of the needle-bar by means of a set-screw of such length as to fasten to said bar if it should be too short to reach the top or bottom of the needle-bar guide, and in an adjustable saw-table, whereby the saw can be brought to any desired point in relation to the saw-hole.

In the drawings, Figure 1 is an elevation of certain parts of a sewing-machine to which my device is attached; Fig. 2, a section on line $x$, looking toward the needle-bar. Fig. 3 is an enlarged view of the set-screw employed to hold the saw in place.

Y is the table, D the cloth-plate, A the stock-arm, V the needle-guide, and W the needle-bar, of an ordinary sewing-machine. S is a hollow sleeve, in which is placed a rod, C, adjusted by means of a thumb-screw, B. The sleeve S and rod C at their respective ends are fastened to arms $b\ a$, the lower arm of which is held to the lower end of the needle-bar W by means of a set-screw, $c$, tapped through the arm $a$. The saw E and frame D' are fastened to the table Y by means of ordinary clamps I I, and to its rear end is pivoted a saw-frame, P T, at K, the hinge R being adjusted on the part D' longitudinally. The ends of the frame-pieces T P are provided with plates, into which the screws L turn to hold the saw in place.

X represents an arm fastened to the sleeve S, and its small end passes through the frame-piece T and gives a vertical reciprocating movement to the saw M.

I claim and desire to secure by Letters Patent—

1. The adjustable clamp consisting of the sleeve S, rod C, arms $a\ b$, and set-screws $c$ B, said sleeve carrying an arm, X, for giving motion to the saw M, as set forth.

2. The combination of the clamp with the needle-bar of a sewing-machine, when connected with the ends of said bar, the arm X, and a scroll-saw.

JOHN G. LETTELIER.

Witnesses:
   R. G. MOREY,
   G. L. CHAPIN.